United States Patent [19]

Floyd et al.

[11] Patent Number: 4,625,029

[45] Date of Patent: Nov. 25, 1986

[54] NOVEL CYCLIC UREAS

[75] Inventors: William C. Floyd, Chester; Bernard F. North, Rock Hill, both of S.C.

[73] Assignee: Sun Chemical Corporation, New York, N.Y.

[21] Appl. No.: 711,105

[22] Filed: Mar. 13, 1985

Related U.S. Application Data

[60] Continuation-in-part of Ser. No. 608,712, May 10, 1984, abandoned, which is a continuation-in-part of Ser. No. 579,516, Feb. 13, 1984, abandoned, which is a division of Ser. No. 513,629, Jul. 14, 1983, Pat. No. 4,455,416.

[51] Int. Cl.[4] .............................................. C07D 239/02
[52] U.S. Cl. .................................... 544/309; 544/314; 544/315
[58] Field of Search ........................ 544/309, 315, 314

[56] References Cited

U.S. PATENT DOCUMENTS

| 3,452,017 | 6/1969 | Petersen | 544/309 |
| 3,502,672 | 3/1970 | Petersen et al. | 544/309 |
| 4,262,121 | 4/1981 | Petersen | 544/309 |

*Primary Examiner*—Lucille M. Phynes
*Attorney, Agent, or Firm*—Cynthia Berlow; Mitchell D. Bittman

[57] ABSTRACT

Cyclic urea/glyoxal/polyol condensates are excellent formaldehyde-free crosslinking resins for cellulosic textile fabrics and insolubilizers for binders in paper coating compositions.

5 Claims, No Drawings

NOVEL CYCLIC UREAS

This application is a continuation-in-part of application Ser. No. 608,712, filed May 10, 1984, now abandoned, which is a continuation-in-part of application Ser. No. 579,516, filed Feb. 13, 1984, now abandoned, which is a division of application Ser. No. 513,629, filed July 14, 1983, now U.S. Pat. No. 4,455,416.

This invention relates to novel products of the reaction of at least one cyclic urea, glyoxal, and at least one polyol. More particularly, it relates to these compounds and their use in treating textiles and paper.

BACKGROUND OF THE INVENTION

The use of glyoxal and of thermosetting resins to impart crease resistance and dimensional stability to textile materials and to insolublize the binders in paper coating compositions is well-known. These resins, known as "aminoplast resins," include the products of the reaction of formaldehyde with such compounds as urea, thiourea, ethylene urea, dihydroxyethylene urea, melamines, or the like. A serious drawback to the use of such materials is that they contain free formaldehyde. This is present during the preparation and storage of the agent and its use in treating textiles or paper, on the treated fabric or paper, and on the finished garments. Also, when the fabrics or garments made therefrom are stored under humid conditions, additional free formaldehyde is produced.

The presence of even less than one percent of free formaldehyde, based on the total weight of the product, is undesirable, not only because of its unpleasant odor, but because it is an allergen and an irritant, causing severe reactions in the operators who manufacture the agent and who treat and handle the treated fabrics and paper and to persons who handle and wear garments fabricated from the treated fabrics.

These problems associated with the presence of free formaldehyde on treated fabrics are well-known and considerable efforts have been made to produce formaldehyde-free textile treating agents and insolubilizers for the binders in paper coating compositions.

Glyoxal is a highly reactive monomer which cures quickly and has excellent crosslinking and insolubilizing properties. As a result of this rapid crosslinking of glyoxal and binder, however, the viscosity of the composition increases so rapidly and is so great that the composition cannot be used. Frequently glyoxal-insolubilized coatings gel completely, particularly in high solids formulations; gelling can occur also in moderate or low solids formulations if they are not used promptly. Thus in situations where it is required that the viscosity remain stable for many hours, for example when high-solids coatings are to be applied by blade coating techniques, a glyoxal system is suitable. Formaldehyde-free agents for treating textiles have been disclosed in the U.S. Pat. Nos. 4,285,690 and 4,332,586 and formaldehyde-free insolubilizers for binders in paper coating compositions have been disclosed in the U.S. Pat. No. 4,343,655.

SUMMARY OF THE INVENTION

It has now been found that condensates prepared from at least one cyclic urea, glyoxal, and at least one polyol are excellent crosslinking agents for textiles and insolubilizers for binders in paper coating compositions and do not contain formaldehyde.

DETAILED DESCRIPTION OF THE INVENTION

In accordance with this invention, novel cyclic urea/glyoxal/polyol condensates are prepared that are useful for crosslinking cellulosic textile fabrics and for insolubilizing binders in paper coating compositions.

The cyclic ureas which may be used have the following general formulas:

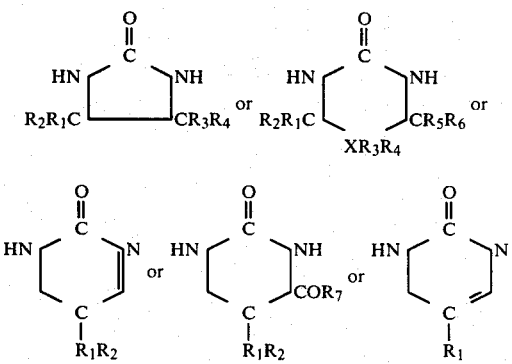

wherein $R_1$, $R_2$, $R_3$, $R_4$, $R_5$, and $R_6$ may be the same or different and each may be H, OH, COOH, R, OR, or COOR wherein R is an alkyl or a substituted alkyl group having 1 to 4 carbon atoms; $R_7$ may be H or a polyol moiety such as $C_2H_4OH$, $CH_2CH_2O(C_2H_4O)_bH$ where b is 0 to 10, $CH_2CH(OH)CH_2OH$, $[CH_2CH(CH_3)O]_cH$ where c is 1 to 10, and the like; and X may be C, O, or N; when X is O, $R_3$ or $R_4$ is each zero; when X is N, $R_3$ or $R_4$ is zero.

Typical examples of such compounds include, but are not limited to, ethylene urea, propylene urea, uron, tetrahydro-5-(2-hydroxyethyl)-1,3,5-triazin-2 one, 4,5-dihydroxy-2-imidazolidone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5-dimethyl propylene urea, 4-methoxy-5,5-dimethyl propylene urea, tetraphydro-5-(ethyl)-1,3,5-triazin-2-one, tetrahydro-5-(propyl)-1,3,5-triazin-2-one, tetrahydro-5-(butyl)-1,3,5-triazin-2-one, dihydro-5-methyl-2(1H, 3H) pyrimidinone, dihydro-5, 5-dimethyl-2 (1H) pyrimidinone, tetrahydro-4-5-methyl-2 (1H) pyrimidinone, tetrahydro-4-(2-hydroxyethyl)-5, 5-dimethyl-2 (1H) pyrimidinone, and the like, and mixtures of these.

Among the cyclic ureas suitable for use in preparing the condensates are tetrahydropyrimidinones that are prepared from urea, formaldehyde, an aldehyde having at least two carbon atoms and at least one α proton, a catalytic amount of acid, and a solvent. Suitable aldehydes are acetaldehyde (2 carbons, 3α protons), propionaldehyde (3 carbons, 2α protons), isobutyraldehyde (4 carbons, 1α proton), n-butyraldehyde (4 carbons, 2α protons), 2-methyl butyraldehyde (5 carbons, 1α proton), and the like. The aldehyde may have additional functionality incorporated, such as 5-hydroxypentanal.

Suitable solvents include water, ethylene glycol, diethylene glycol, propylene glycol, dipropylene glycol, alkoxy ethanols having 1 to 4 carbon atoms, polyethylene glycols, polypropylene glycols, dimethyl formamide, dioxane, acetonitrile, and the like, and mixtures of these. These solvents have an advantage over alcohol solvents because they have a higher heat capacity that better contains the exotherm that accompanies the acid solution step, thus controlling the reaction temperature. On the other hand, alcohol solvents can reflux violently and get out of control.

In general these tetrahydropyrimidinones are prepared by reacting the urea, formaldehyde, and other aldehyde in a 1:1:1 molar ratio. A slight deficiency in any ingredient will cause that ingredient to limit the amount of pyrimidinone formed. Thus, 0.9 mole of urea reacted with 1 mole of formaldehyde and 1 mole of propionaldehyde will result in the formation of 0.9 mole of pyrimidinone with 0.1 mole of formaldehyde and propionaldehyde left over. The latter two may subsequently react with the pyrimidinone as a side reaction. Accordingly, it is important that the amount of any of the ingredients not deviate by more than ±10%.

The amount of acid catalyst is generally within the range of about 1 to 20 mole-percent, and preferably it is within the range of about 5 to 10 mole-percent.

The tetrahydropyrimidinones of this invention are prepared by combining urea, formaldehyde, and accompanying aldehyde in the selected solvent at room temperature and allowed to exotherm as they react to a temperature within the range of about 45° C. to reflux, and preferably to about 50° to 60° C. The reaction is held at this temperature for about 1 to 8 hours, and preferably for about 3 to 4 hours. A catalytic amount of acid is then added; the temperature rises to about 75°–85° C. to reflux, and the reaction is held for about 2 12 hours.

The polyol may be any of a wide variety of materials, including but not limited to ethylene glycol, diethylene glycol, 1,2-propylene glycol, 1,3-propylene glycol, 1,2-butylene glycol, 1,3-butylene glycol, 1,4-butylene glycol, polyethylene glycols having the formula HO(CH$_2$CH$_2$O)$_n$H where n is 1 to about 50, glycerine, and the like, and their mixtures. Other suitable polyols include dextrans, glyceryl monostearate, ascorbic acid, erythrobic acid, sorbic acid, ascorbyl palmitate, calcium ascorbate, calcium sorbate, potassium sorbate, sodium ascorbate, sodium sorbate, monoglycerides of edible fats or oils or edible fat-forming acids, inositol, sodium tartrate, sodium potassium tartrate, glycerol monocaprate, sorbose monoglyceride citrate, polyvinyl alcohol, α-D-methylglucoside, sorbitol, dextrose, and their mixtures.

The glyoxal/cyclic urea/polyol condensate may be prepared by any suitable and convenient procedure. Generally the glyoxal, at least one cyclic urea, and at least one polyol are reacted together at a temperature between room temperature up to reflux. Alternatively, the glyoxal may be reacted with a hydroxyalkylated cyclic urea.

The ratio of amounts of glyoxal; cyclic urea; polyol is generally within the range of about 0.8–2.0:1:0.05–4.0, and preferably the amount of polyol is about 0.4–3 moles.

Typically the tetrahydropyrimidinone/glyoxal/-glycol condensates have IR spectra which show- OH stretch at 3400 cm$^{-1}$, carbonyl at 1650 cm$^{-1}$, and C-O stretch from 1050-1150 cm$^{-1}$, which is consistent with the theoretical structure.

In general, cyclization of the heterocycle can be ascertained by reacting an aliquot with glyoxal. The uncyclized material forms a 5-membered ring with a carbonyl peak at 1700 cm$^{-1}$. The heterocycles described may be isolated by neutralizing the solution and concentrating to a paste. The paste is then taken up in a suitable solvent such as methanol, acetone, or acetonitrile and filtered to remove the salt. The solution is then concentrated to a syrup which may then be characterized or derivatized for further characterization. Of particular utility are the N,N',O-triacetyl derivatives prepared by reacting the syrup with excess acetic anhydride. Such derivatives may be easily prepared, isolated, and characterized by one skilled in the art.

The product is suitable for use with cellulosic textile fabrics, woven or non-woven, including 100% cellulosic fabrics, e.g., cotton, rayon, and linen, as well as blends, e.g., polyester/cotton or polyester/rayon. Such blends preferably but not necessarily contain at least 20% of cellulose. Both white and colored (printed, dyed, yarn-dyed, cross-dyed, etc.) fabrics can be effectively treated with the resins. It is applicable also to fabrics containing fibers with free hydroxyl groups.

When applying the resin to a fabric, there generally will be present an appropriate catalyst. Typical catalysts include acids (such as hydrochloric, sulfuric, fluoboric, acetic, glycolic, maleic, lactic, citric, tartaric, and oxalic acids); metal salts (such as magnesium chloride, nitrate, fluoborate, or fluosilicate; zinc chloride, nitrate, fluoborate, or fluosilicate; ammonium chloride; zirconium oxychloride; sodium or potassium bisulfate); amine hydrochlorides (such as the hydrochloride of 2-amino-2-methyl-1-propanol); and the like, and mixtures thereof. The amount of catalyst generally is about 0.01 to 10 percent, and preferably about 0.05 to 5 percent, based on the weight of the padding bath.

The finishing agents may be applied to the textile fabric in any known and convenient manner, e.g. by dipping or padding, and will generally be applied from aqueous or alcoholic solution. The solvent may be water; an aliphatic alcohol, e.g., methanol, ethanol, or isopropanol; or a mixture of water and an aliphatic alcohol. Other conventional additives such as lubricants, softeners, bodying agents, water repellents, flame retardants, soil shedding agents, mildew inhibitors, anti-wet soiling agents, fluorescent brighteners, and the like may be used in the treating bath in conventional amounts. Such auxiliaries must not, however, interfere with the proper functioning of the finishing resin, must not themselves have a deleterious effect on the fabric, and desirably are free of formaldehyde.

The amount of treating agent which is applied to the fabric will depend upon the type of fabric and its intended application. In general it is about 0.5 to 10 percent, and preferably about 2 to 5 percent, based on the weight of the fabric.

In the process of treating fabrics with the resins, the fabric is impregnated with an aqueous or alcoholic solution of the finishing resin, and the impregnated fabric is then dried and cured; the drying and curing steps may be consecutive or simultaneous.

If desired, the textile fabric may be finished by post-curing (also known as deferred or delayed curing). This consists of impregnating the fabric with a solution of the finishing resin and catalyst; drying the impregnated material carefully so that the finishing agent does not react; and then, after a prolonged interval, heating the material to a temperature at which the agent reacts under the influence of the catalyst.

The condensates also are effective insolubilizers for the binders in paper coating compositions. The binders used in the paper coating compositions include, but are not limited to, unmodified starch; oxidized starch; enzyme-converted starch; starches having functional groups such as hydroxyl, carbonyl, amido, and amino groups; proteins, such as casein, latexes, such as styrenebutadiene rresin; and the like, and their mixtures.

The pigment in the paper coating composition may be clay with or without titanium dioxide and/or calcium carbonate, and the like, and mixtures thereof.

In addition to the binder, the pigment material, and the insolubilizer described above, paper coating compositions may include conventional materials such as lubricants, defoamers, preservatives, colored pigments, and the like, in conventional amounts.

In the paper coating compositions described herein, the amount of binder is based upon the amount of pigment; the ratio varies with the amount of bonding desired and with the adhesive characteristics of the particular binder employed. In general the amount of binder is about 4 to 25 percent, and preferably about 10 to 20 percent, based on the weight of the pigment.

The amount of insolubilizer varies with the amount and properties of the binder and the amount of insolubilization desired; in general it is about 1 to 12 percent, and preferably about 4 to 8 percent, based on the weight of the binder.

The total solids content of the composition generally is within the range of about 50 to 70 percent, depending upon the method of application and the product requirements.

The compositions can be applied to paper or paper-like substrates by any known and convenient means.

Although this invention will be described in relation to treating agents for textile fabrics and insolubilizers for binders in paper coating compositions, it is not intended to be limited thereto. The products can be used in other applications where glyoxal is commonly used, such as for example as a dry-strength or a wet-strength resin in paper; a hand-builder in textiles; a binder in particleboard, medium-density fiberboard, plywood, foundry and shell moldings, insulation materials including glass fiber mats, friction materials, coated and bonded abrasives, etc.; a component in molding compounds; an adhesive for wood and laminates; a film-forming resin in coatings and printing inks; an additive in fibers, e.g., rayon; an additive in rubber processing; an agent in leather tanning; a textile size; a dry fixative for textiles, an impregnant for filters, e.g., automotive filters; and the like.

In order that the invention may be more fully understood, the following examples are given by way of illustration. No specific details contained therein should be construed as limitations on the present invention except insofar as they appear in the appended claims. Unless otherwise specified, all parts and percentages are by weight.

EXAMPLE 1

To a 1-liter flask were added 60 parts (1.0 mole) of urea, 150 parts of water, 60 parts (1.0 mole) of 50% aqueous formaldehyde, and 58 parts (1.0 mole) of propionaldehyde. The reaction mixture was stirred at 50°–55° C. for about 2 hours. Following the addition of a catalytic amount of acid, the reaction mixture was stirred at 80°–85° C. for 4 hours and then cooled.

The product was an amber solution that contained 4-hydroxy-5-methyltetrahydropyrimidin-2-one as the initially formed product. Upon prolonged reaction time, the product dehydrated to 5-methyltetrahydropyrimidin-4-en-2-one. Both may be present in the reaction mixture or a portion of the initially formed product may be separated before dehydration to the other product.

IR data: 4-hydroxy-5-methyltetrahydropyrimidin-2-one: 3300 cm$^{-1}$ (NH,OH); 1660 cm$^{-1}$ (C=O), 1070 cm$^{-1}$

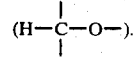

5-methyl-tetrahydropyrimidin-4-en-2-one: 3300 cm$^{-1}$ (NH), 1660 cm$^{-1}$ (C=O). Peak at 1070, absent.

EXAMPLE 2

To a 1-liter flask were added 60 parts (1.0 mole) or urea, 75 parts of water, 75 parts of 1,4-dioxane, 60 parts (1.0 mole) of aqueous formaldehyde, and 72 parts (1.0 mole) of isobutyraldehyde. The reaction mixture was stirred and heated at 50° C. for 2 hours. Following the addition of a catalytic amount of acid, the reaction mixture was heated at its reflux temperature for 6 hours.

The product was a clear solution that contained 4-hydroxy-5,5-dimethyltetrahydropyrimidin-2-one. This was confirmed by IR spectra and by the preparation and characterization of the N,N', O-triacetyl derivative.

IR spectra: 4-hydroxy-5,5-dimethyltetrahydro pyrimidin-2-one: 3300 cm$^{-1}$ (NH,OH,br), 1660 cm$^{-1}$ (C=O,NH) 1075 cm$^{-1}$ (C-O). N,N',O triacetyl derivative: 1750 cm$^{-1}$ (C=O); 1710 cm$^{-1}$ (C=O), 1200 cm$^{-1}$ (C-O). $^1$HNMR (triacetyl derivative, CDCl$_3$): δ6.70 (d,1H,J=1.5H$_z$), δ3.70 (dd,1H,J-1.5H$_z$,J=13H$_z$), δ3.40 (d,1H,j=13H$_z$) δ2.60 (S,3H), δ2.55 (S,3H), δ2.03 (S,3H), δ1.03 (S,6H).

EXAMPLE 3

60 Parts (1.0 mole) of urea, 30 parts (1.0 mole) of paraformaldehyde, 100 parts (1.6 moles) of ethylene glycol, 72 parts (1.0 mole) of isobutyraldehyde, and 20 parts of 40% sulfuric acid were stirred together and heated at 70° C., thereby forming a thick milky paste. The mixture was then heated for 4 hours at 70° C., forming a slightly hazy solution of 5,5-dimethyl-4-hydroxyethoxytetrahydropyrimidin-2-one, confirmed by IR spectra.

EXAMPLE 4

60 parts (1.0 mole) of urea, 30 parts (1.0 mole) of paraformaldehyde, 72 parts (1.0 mole) of isobutyraldehyde, 92 parts (1.5 moles) of ethylene glycol, 46 parts (2.6 moles) of water, and 10 parts of 40% sulfuric acid were stirred together and heated at 70° C. until a clear solution of 5,5-dimethyl-4-hydroxyethoxytetrahydropyrimidin-2-one was formed, confirmed by IR spectra.

EXAMPLE 5

The product of Example 3 (1.0 mole) was reacted with 145 parts (1.0 mole) of glyoxal to produce a condensate of glyoxal/ethylene glycol/5,5-dimethyl-4-hydroxyethoxytetrahydropyrimid-2-one.

EXAMPLE 6

The product of Example 4 was heated with 145 parts (1.0 mole) of 40% glyoxal at 55° C. for 2 hours to form condensate.

EXAMPLE 7

The product of Example 1 was heated with 150 parts (1.08 moles) of 40% glyoxal and 32 parts (0.4 mole) of propylene glycol at 70° C. for 4 hours to form propylene glycolated pyrimidinone/glyoxal condensate.

EXAMPLE 8

The procedure of Example 7 was repeated using the pyrimidone solution of Example 2 instead of that of Example 1. A similar product was obtained.

EXAMPLE 9

140 Parts (1.42 moles) of 87% ethylene urea was reacted with 290 parts (2.0 moles) of 40% glyoxal, 200 parts (1.89 moles) of diethylene glycol, and 70 parts of water to form a clear yellow viscous solution of an ethylene urea/glyoxal/diethylene glycol condensate.

EXAMPLE 10

The procedure of Example 9 was repeated except that the ratio of ethylene urea:glyoxal:diethylene glycol was 1:1.7:1.56 instead of 1:1.4:1.33.

EXAMPLE 11

The procedure of Example 9 was repeated except that the ratio of ethylene urea:glyoxal:diethylene glycol was 1:2:1.89 instead of 1:1.4:1.33.

EXAMPLE 12

The procedurre of Example 9 was repeated with each of the following cyclic ureas instead of ethylene urea: propylene urea, uron, tetrahydro-5-(2-hydroxyethyl)-1,3,5-triazin-2-one, and 4,5-dihydroxy-2-imidazolidinone. The results were comparable.

EXAMPLE 13

The procedure of Example 9 was repeated with each of the following polyols instead of diethylene glycol: ethylene glycol, 1,2-propylene glycol, 1,4-butylene glycol, and glycerine. The results were comparable.

EXAMPLE 14

Aqueous solutions containing 15.0 parts of the products of this invention, 3.75 parts of Catalyst 531 (Sun Chemical Corporation's activated magnesium chloride catalyst), and 0.25 part of Sulfanole®RWD (Sun Chemical Corporation's non-ionic wetting agent) were applied to 100% broadcloth fabric at 62% wet pickup. The treated fabrics were dried by heating for 3 minutes at 225° F. and then cured by heating under these conditions: I (90 seconds at 300° F.), II (90 seconds at 325° F.), and III (90 seconds at 350° F.). The results are tabulated below.

Wrinkle Recovery was measured by AATCC Test Method 66-1978 "Wrinkle Recovery of Fabrics: Recovery Angle Method."

Tensile was measured by ASTM Test Method D-1682-64 (Reapproved 1975) "Tensile-Grab-CRT Pendulum Type."

TABLE 1

|  |  | (A) | (B) | (C) | (D) |
|---|---|---|---|---|---|
| Wrinkle Recovery Angle (WRA) (W + F) | I | 230 | 229 | 232 | 178 |
|  | II | 229 | 233 | 239 | 194 |
|  | III | 235 | 246 | 247 | 193 |
| WRA (5 AHL) (W + F) | I | 219 | 218 | 219 | 186 |
|  | II | 230 | 232 | 237 | 188 |
|  | III | 228 | 233 | 237 | 177 |
| Tensile Strength (Warp) | I | 77 | 75 | 73 | 87 |
|  | II | 62 | 57 | 53 | 90 |

TABLE 1-continued

|  |  | (A) | (B) | (C) | (D) |
|---|---|---|---|---|---|
|  | III | 55 | 49 | 51 | 90 |

(A) is the product of Example 9.
(B) is the product of Example 10.
(C) is the product of Example 11.
(D) is untreated 100% cotton broadcloth fabric.
AHL is automatic home launderings.

EXAMPLE 15

A paper coating composition was prepared by mixing 100 parts of #2 clay, 20 parts of starch (Penford Gum 280, Penick & Ford's hydroxyethylated starch), 1 part of calcium stearate, and 121 parts of water, and the resultant product was used in aliquots with various insolubilizers.

The coating compositions were applied to 46#/ream paper with a #8 Meyer applicator, using a draw-down technique, cured at 105° C. and then tested for viscosity and wet rub. Viscosity was measured with a Brookfield Viscosimeter. The results of the Adams Wet Rub test are reported as the weight in grams of coating removed from the substrate, the less the amount of solids removed, the better the degree of insolubilization.

TABLE II

| Insolubilizer | Amount, % dry basis | Viscosity initial | Viscosity 2 hours | Admas Wet Rub, 1 day | Admas Wet Rub, 4 days | Residue, gram 11 days |
|---|---|---|---|---|---|---|
| (E) | 0 | 3800 | 3600 | 0.0180 | 0.0120 | 0.0095 |
| (F) | 8 | 6100 | 10200 | 0.0128 | 0.0078 | 0.0042 |
| (G) | 4 | 7700 | 13400 | 0.0020 | 0.0048 | 0.0043 |

(E) is the composition with no insolubilizer.
(F) is melamine-formaldehyde.
(G) is propylene glycolated pyrimidinone/glyoxal.

From these data it can be seen that the product of this invention (G) is as effective a stabilizer as the conventional melamine-formaldehyde at half the amount and does not contain or evolve free formaldehyde.

EXAMPLE 16

To illustrate the superiority as an insolubilizer for a binder of a paper coating composition of a product of this invention over glyoxal, a coating composition was prepared as in Example 15. Propylene glycolated pyrimidone/glyoxal at the 4% (dry/dry) level against glyoxal at the 2% level were added to samples of the coating composition, and their viscosities and Adams Wet Rub test results were measured. The results are tabulated below.

TABLE III

| Insolubilizer | Viscosity Initial | Viscosity 2 hours | Admas Wet Rub 1 day | Residue, gram 5 days |
|---|---|---|---|---|
| (G) | 4490 | 6000 | 0.0077 | 0.0063 |
| (H) | 78200 | 54880 | 0.0065 | 0.0030 |

(G) is propylene glycolated pyrimidinone/glyoxal.
(H) is glyoxal.

Wet rub values were slightly superior for the glyoxal, but the viscosities of the product of this invention were significantly lower than those of the glyoxal.

What is claimed is:

1. A cyclic urea selected from the group consisting of 4-hydroxy-5-methyltetrahydropyrimidin-2-one, 5-methyltetrahydropyrimidin-4-en-2-one, 5,5-dimethyl-4-hydroxyethoxytetrahydropyrimidin-2-one, and mixtures of these.

2. 4-hydroxy-5-methyltetrahydropyrimidin-2-one.

3. 5,5-dimethyl-4-hydroxyethoxytetrahydropyrimidin-2-one.

4. 5-alkyltetrahydropyrimidin-4-en-2-one, wherein the alkyl has 1 to 4 carbon atoms.

5. Compound of claim 4 wherein the alkyl is methyl.

* * * * *